United States Patent [19]

Harrell

[11] Patent Number: 5,212,970
[45] Date of Patent: May 25, 1993

[54] MOTOR VEHICLE ANTI-THEFT DEVICE

[76] Inventor: Washington Harrell, 143-18 182 Pl., Springfield Garden, N.Y. 11413

[21] Appl. No.: 899,918

[22] Filed: Jun. 17, 1992

[51] Int. Cl.[5] .............................................. E05B 17/14
[52] U.S. Cl. ......................................... 70/18; 70/239; 70/417; 70/424; 70/455
[58] Field of Search ................... 70/18, 209, 237-239, 70/417, 455, 424, 426-428

[56] References Cited

U.S. PATENT DOCUMENTS

| | | | |
|---|---|---|---|
| 3,665,738 | 5/1972 | Pescuma et al. | 70/237 X |
| 4,020,662 | 5/1977 | Fowler | 70/237 |
| 4,062,193 | 12/1977 | Deleto | 70/237 X |
| 4,074,550 | 2/1978 | Rowlings | 70/237 |
| 4,104,895 | 8/1978 | Tankel | 70/237 |
| 4,598,562 | 7/1986 | Freeman | 70/237 |
| 4,627,514 | 12/1986 | Brown | 70/417 X |
| 4,726,207 | 2/1988 | Gifford | 70/237 X |
| 4,955,215 | 9/1990 | Eremita | 70/417 X |
| 4,974,433 | 12/1990 | Wang | 70/238 X |
| 5,113,674 | 5/1992 | LiCausi | 70/18 X |

Primary Examiner—Lloyd A. Gall
Attorney, Agent, or Firm—Richard L. Miller

[57] ABSTRACT

A motor vehicle anti-theft device is provided which consists of an enclosure to fit about a steering column and an ignition switch on the steering column of the motor vehicle. A mechanism is for locking the enclosure about the steering column, so as to prevent an unauthorized operation of the ignition switch on the steering column. A cover member extends from the side of the enclosure to block any ignition switch alternately located on the dashboard of the motor vehicle, to also prevent the unauthorized operation of an ignition switch on the dashboard.

3 Claims, 2 Drawing Sheets

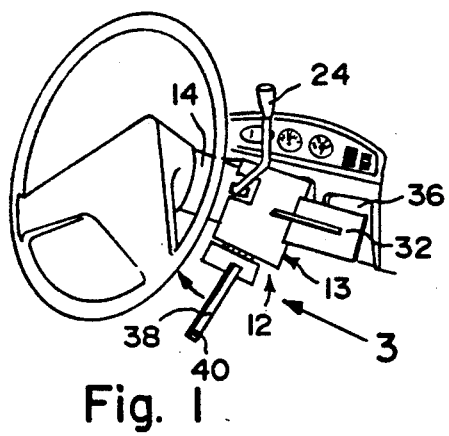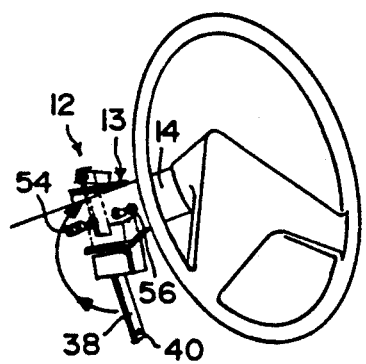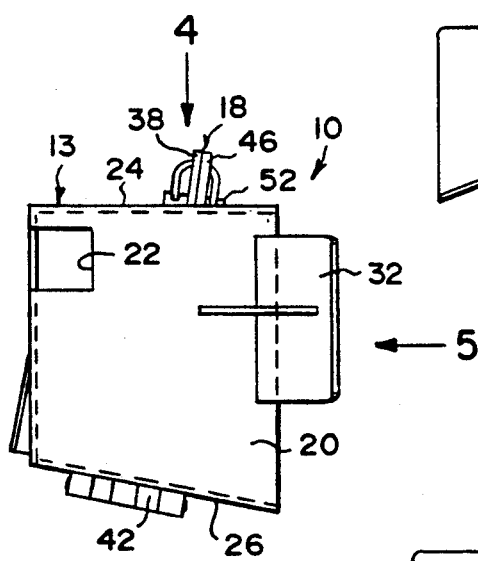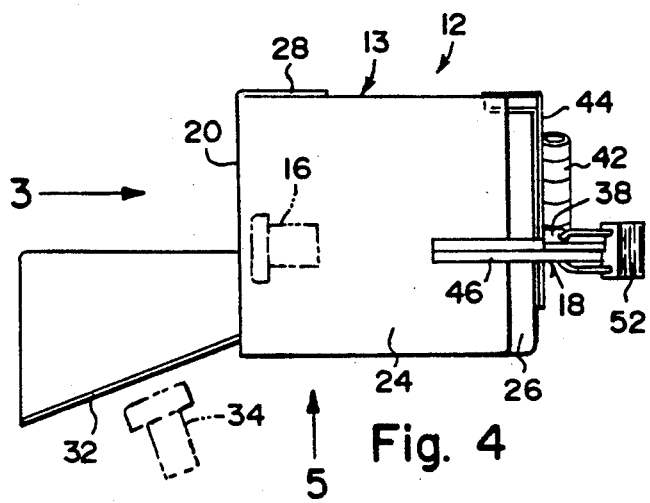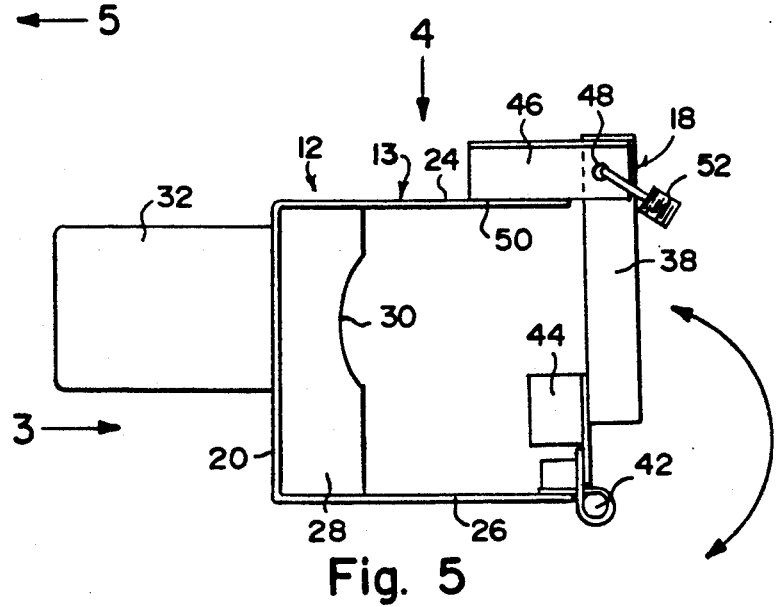

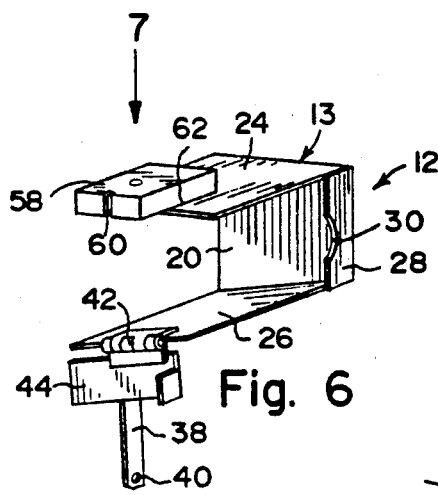
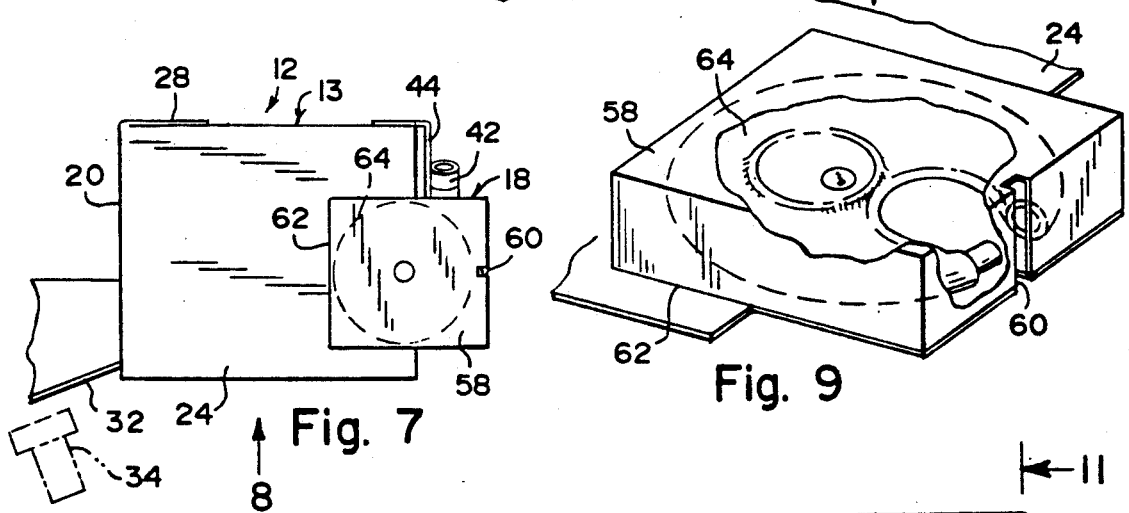
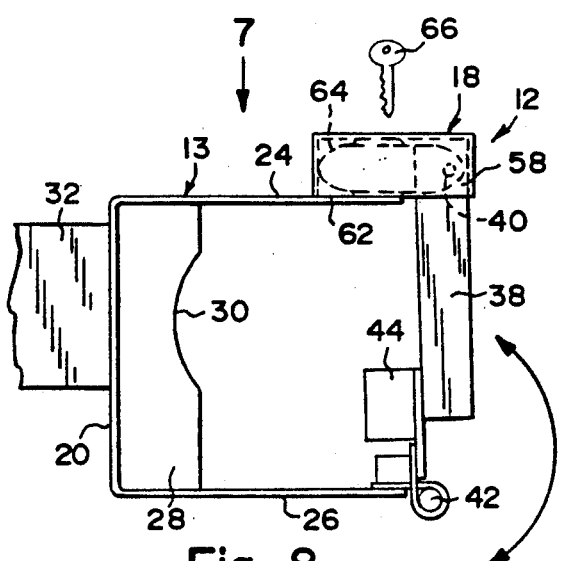
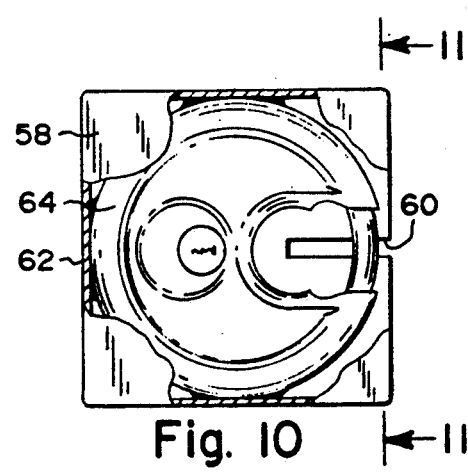
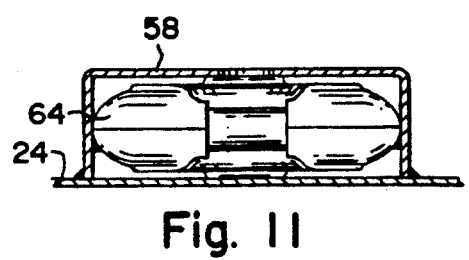

MOTOR VEHICLE ANTI-THEFT DEVICE

BACKGROUND OF THE INVENTION

The instant invention relates generally to security shields for automobile ignition switches and more specifically it relates to a motor vehicle anti-theft device.

Numerous security shields for automobile ignition switches have been provided in the prior art that are adapted to prevent the tampering of the ignition switches, so as to stop thieves from stealing the automobiles. For example, U.S. patents numbered 4,008,589 to Harrell; 4,008,590 to Berkowitz et al.; 4,118,961 to Lee; 4,154,071 to Castle; 4,747,282 to Nyun and 4,955,215 to Eremita all are illustrative of such prior art. While these units may be suitable for the particular purpose to which they address, they would not be as suitable for the purpose of the present invention as hereafter described.

SUMMARY OF THE INVENTION

A primary object of the present invention is to provide a motor vehicle anti-theft device that will overcome the shortcomings of the prior art devices.

Another object is to provide a motor vehicle anti-theft device that is attachable to a steering column of the motor vehicle and is so configured that it will cover and protect an ignition switch located on the steering column or on a dashboard of the motor vehicle.

An additional object is to provide a motor vehicle anti-theft device that can be secured to and removed from the steering column with just a key but without using special tools and skills.

A further object is to provide a motor vehicle anti-theft device that is simple and easy to use.

A still further object is to provide a motor vehicle anti-theft device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The FIGURES in the drawings are briefly described as follows:

FIG. 1 is a diagrammatic perspective view illustrating a first embodiment of the instant invention being installed in a motor vehicle as seen from the ignition switch side of a steering column;

FIG. 2 is a diagrammatic perspective view of the first embodiment illustrating the instant invention being installed in the motor vehicle as seen from the side opposite the ignition switch side of the steering column;

FIG. 3 is a side elevational view taken in the direction of arrow 3 in the FIGS. 1, 4 and 5 of just the instant invention per se in a locked position;

FIG. 4 is a top plan view taken in the direction of arrow 4 in FIGS. 3 and 5;

FIG. 5 is a rear elevational view taken in the direction of arrow 5 in FIGS. 3 and 4;

FIG. 6 is a dragrammatic front perspective view illustrating a second embodiment of the instant invention per se in an unlocked position;

FIG. 7 is a diagrammatic top plan view, with parts broken away, taken in the direction of arrow 7 in FIGS. 6 and 8, in a locked position;

FIG. 8 is a diagrammatic rear elevational view taken in the direction of arrow 8 in FIG. 7 in a locked position;

FIG. 9 is an enlarged diagrammatic perspective view with parts broken away illustrating the internal construction of the lock mechanism;

FIG. 10 is a top plan view, also with parts broken away, taken in the direction of arrow 10 in FIG. 9; and FIG. 11 is a cross sectional view taken along line 11—11 in FIG. 10.

DETAILED DESCRIPTION OF THE PREFERRED EMBODIMENTS

Turning now descriptively to the drawings, in which similar reference characters denote similar elements throughout the several views, the FIGURES illustrate a motor vehicle anti-theft device 12, which consists of an enclosure 13 to fit about a steering column 14 and an ignition switch 16 on the steering column 14 of the motor vehicle. A mechanism 18 is provided for locking the enclosure 12 about the steering column 14, so as to prevent an unauthorized operation of the ignition switch 16 on the steering column 14.

The enclosure 13 includes a side wall 20 having an opening 22 for an automatic gear shift lever 24 on the steering column 14 to pass through. A top wall 24 extends from the side wall 20, while a bottom wall 26 also extends from the side wall 20. A front wall 28 has a cutout area 30, so that the steering column 14 can pass through the enclosure 13.

A cover member 32 extends from the side wall 20 of the enclosure 13 to block any ignition switch 34 which may alternately be located on a dashboard 36 of some motor vehicles adjacent the steering column 14, so as to prevent an unauthorized operation of the ignition switch 34 on the dashboard 36.

The locking mechanism 18, shown in FIGS. 1 through 5, contains a movable arm 38 having an aperture 40 through one end and is hinged at an opposite end 42 to the bottom wall 26 opposite from the side wall 20. An L-shaped holding plate 44 is affixed transversely to the moveable arm 38 adjacent the hinged end. A stationary arm 46 has an aperture 48 through one end and is mounted at an opposite end 50 to the top wall 24 opposite from the side wall 20. To secure a motor vehicle a padlock 52 is provided to extend through the aperture 48 in the stationary arm 46 and the aperture 40 in the moveable arm 38, when the moveable arm 38 is pivoted into an upright position between a signal turn lever 54 and a signal light switch 56 on the steering column 14. When installed in the vehicle for which it is designed the opening formed by the cutout area 30, the L-shaped holding plate 44, top wall 24 and bottom wall 26 are sized such that the anti-theft device 12 will snugly fit that vehicle's particular steering column 14.

The locking mechanism 18, shown in FIGS. 6 through 11, is similar to the locking mechanism 18, shown in FIGS. 1 through 5. Instead of the stationary arm 46 a housing 58 is provided having a slot 60 extending inwardly at one end and is mounted at an opposite end 62 to the top wall 24 opposite from the side wall 20. A key operated lock 64 is secured within the housing 58. When the movable arm 38 is pivoted into an upright position between the signal turn lever 54 and a signal light switch 56 on the steering column 14 the end with the aperture 40 will enter the slot 60 in the housing 58. A key 66 will operate the lock 64, so it will engage with the aperture 40 of the moveable arm 38.

To use the motor vehicle anti-theft device 10, a person must install the enclosure 13 on the steering column 14 and lock it with the locking mechanism 18. This will prevent an unauthorized person or a thief from gaining access to the ignition switch 16 on the steering column 14 or the ignition switch 34 on the dashboard 36. been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A motor vehicle anti-theft device which comprises:
   a) an enclosure to fit about a steering column and an ignition switch on the steering column of the motor vehicle; and
   b) means for locking said enclosure about the steering column, so as to prevent an unauthorized operation of the ignition switch which may be located on a dashboard or alternatively located on the steering column, wherein said enclosure includes:
      i) a side wall having an opening for an automatic gear shift lever on the steering column to pass through;
      ii) a top wall extending from said side wall;
      iii) a bottom wall extending from said side wall;
      iv) a front wall having a cutout area, so that the steering column can pass through said enclosure; and
      v) a cover member extending from said side wall of said enclosure to block an ignition switch on a dashboard of the motor vehicle adjacent the steering column, so as to prevent an unauthorized operation of the ignition switch on the dashboard.

2. A motor vehicle anti-theft device as recited in claim 1, wherein said locking means includes:
   a) a moveable arm having an aperture through one end and hinged at an opposite end to said bottom wall opposite from said side wall;
   b) an L-shaped holding plate affixed transversely to said moveable arm adjacent said hinged end; and
   c) a stationary arm having an aperture through one end and mounted at an opposite end to said top wall opposite from said side wall, so that a shackle of a padlock may extend through said aperture in said stationary arm and said aperture in said moveable arm when said moveable arm is pivoted into an upright position between a single turn lever and a signal light switch on the steering column.

3. A motor vehicle anti-theft device as recited in claim 1, wherein said locking means includes:
   a) a moveable arm having an aperture through one end and hinged at an opposite end to said bottom wall opposite from said side wall;
   b) an L-shaped holding plate affixed transversely to said moveable arm adjacent said hinged end;
   c) a housing having a slot extending inwardly at one end and mounted at an opposite end to said top wall opposite from said side wall; and
   d) a key operated lock secured within said housing, so that when said moveable arm is pivoted into an upright position between a signal turn lever and a signal light switch on the steering column, said end with said aperture will enter said slot in said housing and a key will operate said lock, so it will engage with said aperture of said moveable arm.

* * * * *